May 13, 1952  D. T. DOBBINS  2,596,378
HELICOPTER BLADE PITCH CONTROL MECHANISM
Filed July 3, 1945  3 Sheets-Sheet 1

INVENTOR.
BY David T. Dobbins
Lynn V. Latta
His Attorneys

May 13, 1952 D. T. DOBBINS 2,596,378
HELICOPTER BLADE PITCH CONTROL MECHANISM
Filed July 3, 1945 3 Sheets-Sheet 2

INVENTOR.
BY David T. Dobbins
Lynn Latta
His Attorney

May 13, 1952     D. T. DOBBINS     2,596,378
HELICOPTER BLADE PITCH CONTROL MECHANISM
Filed July 3, 1945     3 Sheets-Sheet 3

INVENTOR.
David T. Dobbins
BY
Lynn & Latta
Attorney

Patented May 13, 1952

2,596,378

UNITED STATES PATENT OFFICE 2,596,378

HELICOPTER BLADE PITCH CONTROL MECHANISM

David T. Dobbins, Los Angeles, Calif.

Application July 3, 1945, Serial No. 602,945

14 Claims. (Cl. 170—135.4)

This invention relates to helicopter blade pitch control mechanisms. It may be applied either to a helicopter carrying a gondola or cabin for the operator and passengers, or may be embodied in a relatively small, light type of helicopter in which the operator is simply strapped to a harness forming part of the non-rotating part of the helicopter.

An important object of the invention is to provide a helicopter in which the rotor is capable of being adjusted from a position approximately in a horizontal plane, in which it is effective for directly vertical lifting for take-off and landing operations, to a position wherein its axis of rotation is approximately horizontal, in which position it is adapted for pulling the helicopter horizontally through the air at maximum speed, functioning primarily as a propeller.

Another object of the invention is to provide a helicopter embodying a hub mechanism enclosed within a spinner, in articulated relation to a non-rotating mechanism supported upon the hub mechanism and comprising either a gondola or a body supporting harness. A further object is to provide a helicopter embodying a hub spinner which cooperates with a body fairing to provide an overall streamlined fuselage the parts of which may be articulated with reference to each other during flight.

A further object of the invention is to provide an improved helicopter blade control mechanism in combination with a non-rotating portion of the helicopter which is linked to such control mechanism in a manner to permit of blade control throughout the relatively articulated positions of the rotor and non-rotating mechanism of the helicopter.

Another object is to provide a helicopter embodying power units in or near the tips of the rotor blades together with an improved hub mechanism embodying controls for said power mechanism, and connections between said controls and the power units, said connections extending through the blades.

Another object of the invention is to provide, in connection with a helicopter rotor embodying blades with power units at their tips and a hub mechanism including controls for the blades, a relatively simple timing control for simultaneously timing the power units of both blades.

A further object is to provide a helicopter including such control mechanism, in which provision is made for permitting relative articulating movement between the hub mechanism and the non-rotating portion of the helicopter.

Another object is to provide a helicopter embodying control surfaces positioned to act upon the slip stream of the rotor, together with novel and simplified means for operating said control surfaces.

Another object of the invention is to provide a helicopter in which a majority of the controls are adapted to be connected directly to the body of the operator so as to be operable by him without using his hands therefor, whereby his hands are left free for other operations.

Other objects of the invention will appear in the following specifications, in connection with the appended drawings, wherein:

Fig. 6 is a horizontal sectional view of the main bearing mechanism; and

Fig. 7 is a perspective view of a modified form of the invention.

Figures 1, 2, 3:
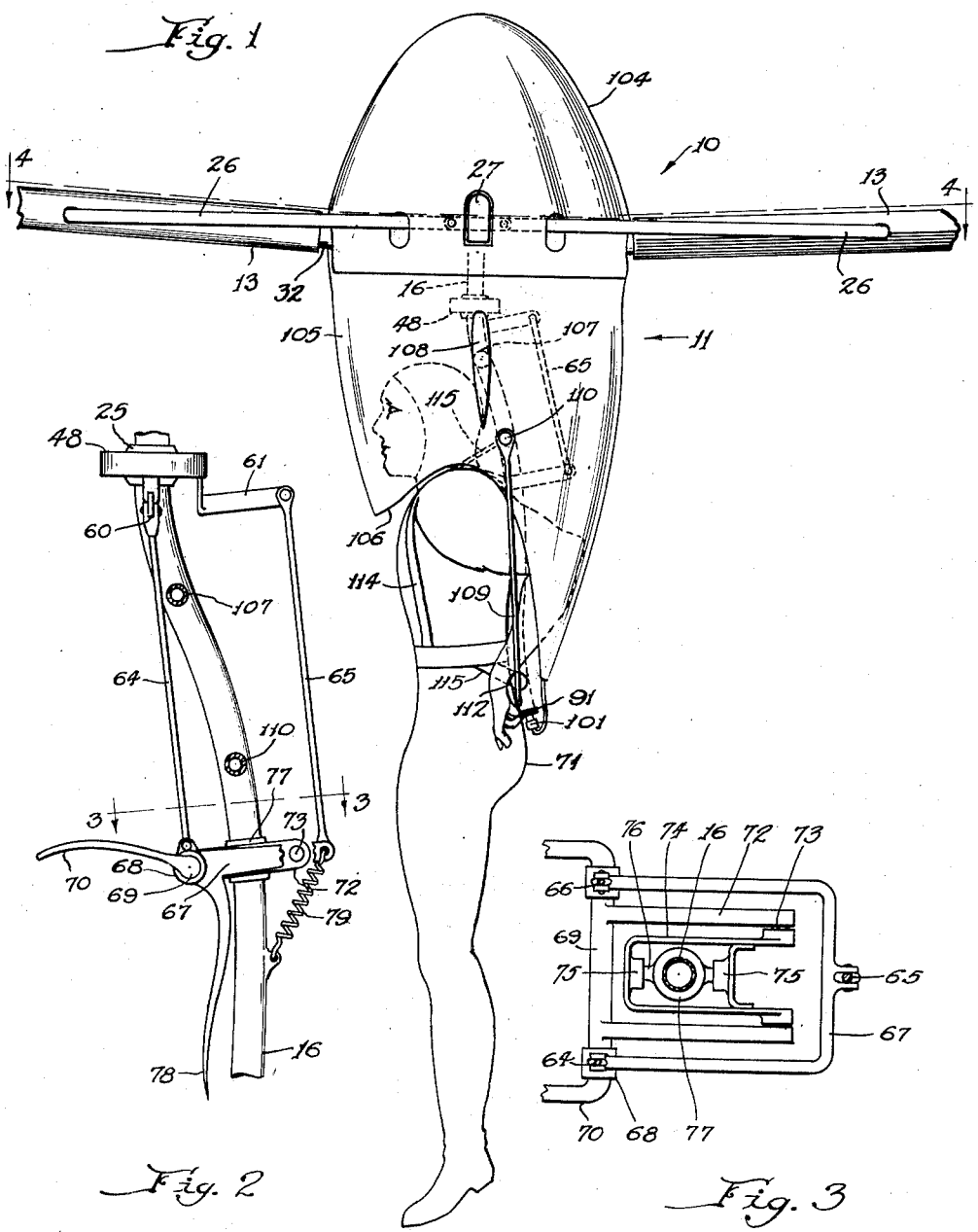
Fig. 1 is a side elevation of a helicopter embodying the invention.
Fig. 2 is a side elevation of a portion of the control apparatus thereof.
Fig. 3 is a horizontal sectional view of the control apparatus taken on the line 3—3 of Fig. 2.
Figure 4:
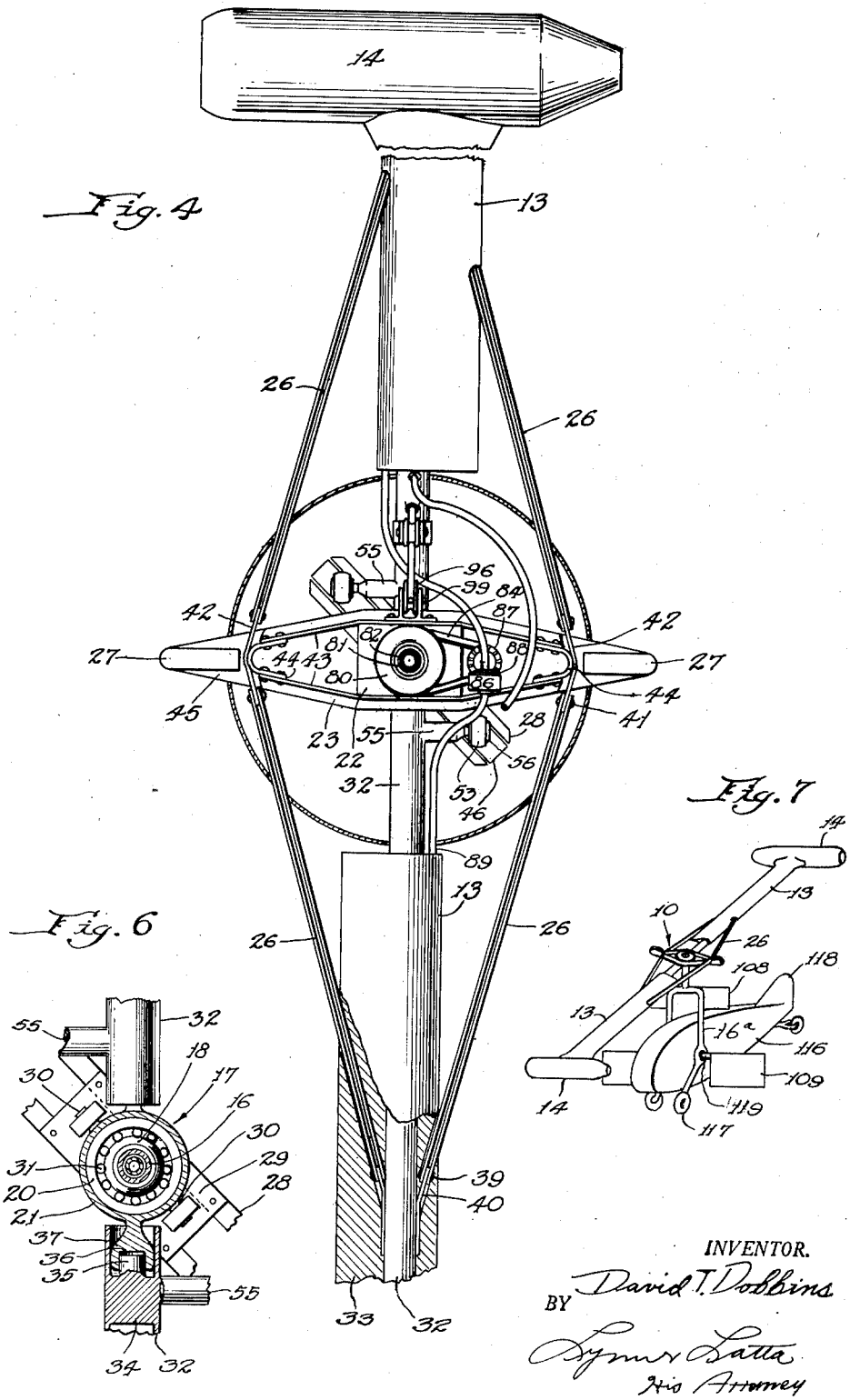
Fig. 4 is a horizontal sectional view of the helicopter taken on the line 4—4 of Fig. 1.
Figure 5:
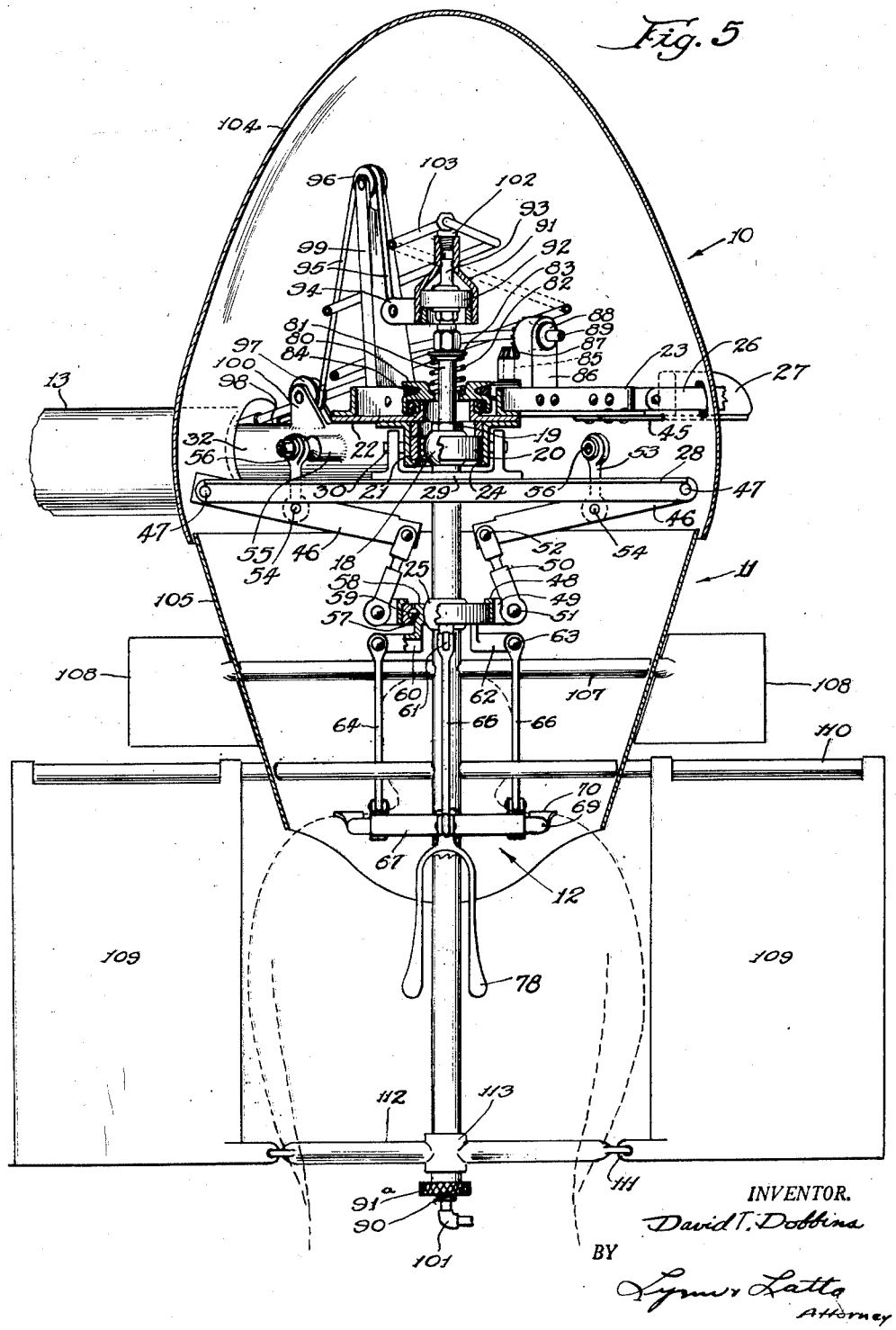
Fig. 5 is a vertical sectional view of the helicopter.

As an example of one form in which the invention may be embodied, I have shown in Figs. 1 to 6 inclusive a helicopter of a type that may be designated a "personal flying machine." A helicopter of this type embodies generally a rotor, which is indicated generally at 10, a non-rotating portion, indicated generally at 11, incorporating suitable harness mechanism for supporting the operator, and control mechanism, which is indicated generally by the reference numeral 12.

The rotor 10 includes a hub portion which embodies mechanism for mounting a pair of sustaining blades 13, for taking the radial thrusts developed therein by centrifugal forces, and for transmitting from the non-rotatable portion of the craft to the blades 13, and through the blades 13 to the jet motors 14 carried by the outer ends thereof, the various control effects by which the craft is operated and maneuvered.

The non-rotating body portion 11 is suspended from the rotor upon a pylon or backbone shaft 16 through the medium of a universal bearing and joint which is indicated at 17. Such bearing and joint includes an inner race member 18 which is secured upon the upper end of the pylon 16 by a nut 19 threaded upon said upper end, an outer race member 20, an annular collar 21 in which the outer race member 20 is retained, and a plate 22 by means of which the collar 21 is secured to the main frame 23 of the rotor.

The outer race 20 rests against an inturned flange 24 at the bottom of the collar 21, and is held against such flange by a spacer ring which is engaged between its upper extremity and the plate 22.

The main frame 23, which forms a part of the rotor, serves primarily as an anchoring support from which the rotor blades 13, when they are at rest, are suspended in drooping positions upon suspension links 26. The links 26 also transfer the radial loads of centrifugal forces acting in the blades 13 during flight to the frame 23, which is constructed in a manner to take such forces, and which incorporates a pair of flyweights 27 which assist the frame 23 in maintaining a plane of rotation which resists tilting transversely of the pitch change axes of the blades, whereby to provide adequate support for the control mechanism which will be described hereinafter, and to enable such control mechanism to function properly.

Suspended below the rotor frame 23, and disposed with its longitudinal axis at an angle of approximately 45 degrees relative to the longitudinal axis of the frame 23, is a control frame 28. The frame 28 has a hinged connection with the collar 21 comprising a bracket 29 secured to the frame 28, and having a pair of spaced outstanding ears each having a bearing for receiving a cylindrical trunnion 30 attached to the collar 21. This connection, together with the universal pivotal movement provided for between the bearing races 18 and 20, permits the rotor to operate in a plane that is inclined with reference to a plane normal to the axis of the pylon 16 at the bearing 17. Consequently, the axis of the bearing trunnions 30 intersects the center of the pivotal movement of the bearing. The bearing races 18 and 20 are separated by bearing balls or rollers 31.

The blades 13 each include a spar 32 and a covering of light material 33 which may be balsa wood. The inner end of each spar 32 embodies a plug 34 spaced from the end of the spar to define a socket in which is received a semispherical bearing member 37 attached to the collar 21. This provides a piloting connection between the inner end of the spar and the main bearing which permits any of the following relative movements between the spar and the main bearing: (1) radial extension and recession of the spar with reference to the rotor hub as the rotor blades move vertically; (2) hinging movements of the spar with reference to the rotor hub as the rotor blades move vertically; and (3) rotation of the blades about the spar axes in order to accommodate pitch changing movements. The sockets 35 and bearing member 37 constitute a universal piloting connection between the inner end of each spar and the hub, but do not in any way assist in taking the radial loads developed by centrifugal force. Such loads are carried wholly by the suspension links 26, each of which is pivoted at 39 to a bracket 40 welded to a spar 32 and is pivoted at 41 to a bracket 42 attached to the main frame 23. The universal piloting connection does, however, serve to provide an abutting end thrust connection between the inner end of each spar 32 and the hub when the blades 13 are being supported in their drooping, at-rest positions. In this connection it is to be noted that the pivots 41, anchoring the suspension links 26 to the frame 23, are disposed in a plane substantially above the plane of the universal piloting connections 35, 37, so that when the blades 13 are in their drooping positions, the suspension links and spars will form with the hub a cantilever support for the blades 13. It is to be understood that the suspension links 26 are of sufficient flexibility to twist readily in accommodating the pitch changing movements of the blades, and that such twisting movements may readily occur while the links are in tension, without interfering with their supporting functions. It should also be understood that where the links 26 extend through openings in the blade air foils 13, in order to reach the spars 32, such openings will have sufficient clearance to allow the required degree of blade pitch adjustment. The links 26 are connected, not to the blade air foils 33, but directly to the spars 32, and the clearance between the blade air foils and the links 26 mut be sufficient to avoid any bearing of the air foils against the links when the air foils are rotated about the axes of spars 32.

The frame 23 comprises a pair of angle irons 43 joined at their ends by U-shaped brackets 44 having horizontal flange extensions 45 on which the counterweights 27 are mounted. The central regions of the angle irons 43 are secured to the plate 22.

The control frame 28 serves as a fulcrum for the outer ends of a pair of control levers 46 which are pivoted thereto at 47. The levers 46 form a part of linkage for transmitting, from a swash ring 48 to the spars 32, movement for changing the pitch of the blades 13. Such linkage includes a pair of ears 49 attached to the ring 48, pull links 50 pivoted to the respective ears 49 at 51, and to the inner ends of the levers 46 at 52, pull links 53 universally pivoted to the intermediate regions of the levers 46, at 54, and arms 55 universally pivoted at 56 to the upper ends of the pull links 53.

The swash ring 48 is secured to the outer race of a bearing including such outer race 57, an inner race 58 and balls 59 interposed between these two races. The inner race 58 constitutes the socket member of a universally pivotal connection between the bearing and the pylon 16, the other member of such pivotal connection being a ring 25 having a semi-spherical exterior surface coacting with the mating surface of the race 58 and a cylindrical bore slidably receiving the pylon 16 and forming a bearing connection therewith.

Depending from the inner bearing race 58 are three arms 60, 61 and 62 respectively, each arm being extended radially outwardly at its lower end, with the arms 60 and 62 extending respectively to the left and to the right, and with the arm 61 projecting rearwardly. These three arms are pivoted at 63 to three control rods 64, 65 and 66. These control rods extend downwardly and at their lower ends are pivoted to a yoke 67, the rods 64 and 66 being attached to the ends of the arms of the yoke 67, and the rod 65 being attached to the web portion of the yoke at the center thereof. Journalled in bearings 68 at the ends of the arms of the yoke 67 is a rock shaft 69 having arms 70 projecting forwardly and adapted to rest across the shoulder of an operator 71, and having arms 72 projecting rearwardly. The arms 72 at their rear ends are pivoted, at 73, to the respective arms of a yoke 74 which carries a bearing 75 journalled upon trunnions 76 on a collar 77 secured to the shaft 16.

The yoke 67 is provided with downwardly extending arms 78 which are adapted to engage the operator 71 in the small of the back, being urged into such engagement by a spring 79 under tension between the web of the yoke 67 and the shaft 16. By arching his back rearwardly, the operator is able to transmit through the arms 78, counterclockwise movement of the yoke 67 about the shaft 69, which movement, transmitted through the rod 65, will tilt the bearing 57, 58 in a counterclockwise direction (as viewed from the left). By raising one shoulder and simultaneously depressing his other shoulder, the operator is able to tilt the bearing 57, 58 laterally about the axis of the central bearing member 59, raising the bearing on the side on which he raises his shoulder and lowering the bearing on the other side. In such tilting action, the shaft 69, the arms 72, the yoke 67 and the yoke 74 all tilt upon the trunnions 76.

Tilting of the bearing 57, 58 results in cyclic pitch control of the blades 13 through the links 50, levers 46 and links 53 as the rotor rotates. Such cyclic pitch control is utilized for maneuvering the helicopter in accordance with known practice.

Collective pitch control is accomplished by raising or lowering both shoulders simultaneously. This action causes the arms 72 to fulcrum on the pivots 73 while the shaft 69 is translated bodily upwardly or downwardly, the yoke 67 being translated with the shaft 69, without tilting, thus causing all three rods 64, 65 and 66 to move vertically in unison, and the bearing 59 to shift vertically on the pylon shaft 16. Collective pitch control is of course utilized for varying lift and speed in accordance with known practice. It will be obvious that any desired combination of collective and cyclic pitch control may be produced by the control apparatus described above.

Journalled on a bearing carried by a cylindrical collar formed in the center of the plate 22, is a pulley 80. A tubular shaft 81 extends through the larger pylon shaft 16, and is provided with a suitable connection (not shown) with the shaft 16, which permits a limited amount of longitudinal movement between the two shafts for preventing relative rotation thereof. Thus the shaft 81 is fixed against rotation and the pulley 80 in turn is held against rotation by a coil spring 82 under compression between the pulley 80 and a head 83 on the shaft 80.

Through a belt 84 the pulley 80 drives a smaller pulley on a shaft 85 which is journalled in a bearing 86 carried by the frame 23. On the upper end of the shaft 85 is a bevel pinion 87 which drives a bevel gear 88 also journalled in the bearing 86. Bevel pinion 87 has a planetary movement above lock pulley 80 and is accordingly referred to hereinafter as a planet element. The bevel gear 88 drives a flexible shaft 89 which extends through the blades 13 and rotates the timing cams of the jet motors 14, which timing cams are shown in detail in my U. S. Letters Patent Number 2,514,749, issued July 11, 1950 for Aircraft Propulsion Mechanism. The propulsion mechanism shown in that patent forms a part of the helicopter of the present invention.

Control movements are transmitted to the timing cams by a cap having a connection, through a bearing 92, with a nipple 93 on the upper end of the shaft 81. Attached to a pair of ears 94 on the cap 91 are a pair of cables 95 which pass upwardly over pulleys 96, thence downwardly and around pulleys 97, and thence through suitable bearings 98 into the spars through which they pass to the jet motors. The pulleys 96 are carried on the upper ends of brackets 99 and the pulleys 97, on brackets 100, these brackets being arranged so as to direct the said upwardly extending cable portions substantially toward the center of the bearing 17, and the downwardly extending cable portions substantially toward the center of blade pitch adjustment and "flapping" movement.

Fuel for the motors is piped from a connection 101 through the shaft 81 to a T 102 in the cap 91, from which a pair of flexible metal or rubber tubes 103 extend spirally downwardly and outwardly and thence through the spars 32 to the jet motors 14. The spiral form of the tubes 103 permits vertical movement of the cap 91 without injury to the tubes or interference with their fuel transmitting capacity.

I provide a fuselage comprising a spinner 104 enclosing all of the mechanism of the rotor with the exception of the blades, motors and flyweights, and a non-rotating body portion or fairing 105 which is of transparent material such as Plexiglas. The fairing 105 is cut away as at 106 to permit the shoulders and body of the pilot to be exposed while his head is protected by the fairing.

Projecting laterally from the fairing 105 and carried on the ends of a shaft 107 attached to the shaft 16, are a pair of stabilizer vanes 108. For maneuvering about the main longitudinal axis of the craft, I provide a pair of vanes 109 which are hinged on a shaft 110 carried by the shaft 16. To the lower corners of the vanes 109 are linked, as at 111, the ends of a tiller lever 112 having a hub 113 journalled upon the shaft 16.

The pilot is supported in the craft by a harness 114 strapped about his torso and having strap portions 115 anchored to the cross shafts 110 and 112. The tiller shaft 112, being thus held against the pilot's hips by the straps 115, will be oscillated about the shaft 16 when the pilot twists his body, thus causing the vanes 109 to shift respectively forwardly and rearwardly of their common neutral plane. Thus it is possible to set up a contra-rotative force for neutralizing torque reaction resulting from hub friction, the drive to the auxiliary mechanism, etc., and also provides for maneuvering about the axis of the shaft 16 and for lift in forward flight.

In the form of the invention shown in Fig. 7 the helicopter is of larger size and instead of a harness for supporting a single person, is provided with a gondola 116 suspended in a fork 16a. At the lower end of the arms of the fork 16a are landing wheels 117. At the tail of the gondola 116 is a stabilizing fin 118. Control vanes 109 function in a manner similar to that described with reference to the other form of the invention. In other respects, including the swash ring and all mechanism above the same, the invention is the same, except for size, as the form of the invention shown in Figs. 1-6 inclusive.

Any suitable control transmitting mechanism, within the range of those skilled in the art, may be utilized for transmitting movements from a control element (which, in accordance with conventional practice, could be disposed within cabin 116) to the swash ring of such control mechanism.

In the operation of the helicopter shown in Fig. 1, the take-off is accomplished by the pilot standing upright with the helicopter supported upon his shoulders, its rotor axis substantially vertical, as shown in Fig. 1. The motors are then started and the rotor thus caused to rotate at a speed which may be gradually increased by adjusting the timing and fuel supply (the latter may be effected through a suitable valve incorporated in the connection 101). When sufficient speed has been attained, the craft will rise vertically, the stabilizers taking the torque reaction and preventing the entire craft from being rotated bodily.

At an adequate elevation, the pilot may, by arching his back rearwardly, produce a cyclic pitch adjustment of the rotor blades which will increase the lift at the rear side of the rotor and decrease the lift at the forward side of the rotor. This will cause the entire rotor to tilt forwardly, altering the direction of flight toward the horizontal. The entire craft, and the pilot's body, may then be oriented to a substantially horizontal position, and the stabilizers 108 will then function as wings while the rotor 10 acts as a propeller for pulling the helicopter horizontally through the air.

In the form of the invention shown in Fig. 7, the operation will be similar, except that the gondola 116 will maintain a horizontal axis at all times, and the rotor 10 and fork 16a will swing about the horizontal axis of the pivots 119 connecting the gondola to the fork 16a.

It is to be understood that the term "operator supporting means" used in the appended claims is to be taken as referring to either the harness mechanism of Fig. 1 or the gondola of Fig. 7.

I claim as my invention:

1. In a helicopter, a sustaining and propelling rotor, a pylon having a universally pivotal connection with said rotor and suspended therefrom in flight, said connection permitting the plane of the rotor to be inclined from a normal plane at right angles to the axis of said pylon, said rotor including a hub and pitch adjustable blades having universally pivotal connection with said hub, an elongated frame forming a rigid part of said hub, including means projecting from opposite sides of the pylon axis and counterweights carried by said projecting means and providing for gyroscopic stability of the plane of rotation of said frame, and means including linkage intermediately connected to said frame, for transmitting pitch adjustment to said blades, whereby said frame provides a gyroscopically stabilized fulcrum from which to adjust the pitch angle of said blades.

2. In a helicopter having operator supporting means including a rotor shaft, a hub mounted on said shaft with its center fixed axially with reference to the shaft, a pair of blades each including a spar, means connecting each spar to said hub for universal pivotal movement, said spar being longitudinally slidable with reference to said connecting means, and a pair of constantly tensioned suspension links each attached at its inner end to the hub and at its outer end to a respective blade, said links being positioned generally in the plane of rotation of the blade during flight, so as to transmit to said hub the centrifugal loads developed in the blades, said spars being arranged to make abutting contact with the hub in drooping positions in which the blades will be supported by the cooperating action of said suspension links and said abutting contact.

3. In a helicopter having operator supporting means including a rotor shaft, a hub mounted on said shaft with its center fixed axially with reference to the shaft, a pair of blades each including a spar, means connecting each spar to said hub for universal pivotal movement, said spar being longitudinally slidable with reference to said connecting means, and a pair of constantly tensioned suspension links each attached at its inner end to the hub and at its outer end of a respective blade, said links being positioned generally in the plane of rotation of the blade during flight, so as to transmit to said hub the centrifugal loads developed in the blades, said links being substantially non extensible in operation and being pivotally connected to the hub in a plane above the plane of the connection between said spars and the hub, whereby said blades may move to downwardly and outwardly inclined drooping positions, said spars sliding inwardly with reference to said universally pivotal connection as the blades thus move downwardly, said spars having means to make abutting contact with the hub in said drooping positions, said last means cooperating with said suspension links to support the blades in said drooping positions.

4. A helicopter as defined in claim 2, wherein the links of each pair diverge toward the hub and are adapted to transmit torque loads between the blades and the hub, and to maintain the circumferential positioning of the blades relative to each other.

5. In a helicopter, a rotor comprising a hub frame and blades attached thereto, a jet motor carried at the outer end of each blade, a pylon universally pivoted to said hub frame, a tubular fuel transmitting shaft extending upwardly through said pylon, means including said pylon, said blades and flexible connections between said blade and the upper end of said pylon for transmitting fuel to said motor, a sun element rotatably mounted in said frame, a connection between said sun element and said pylon whereby said sun element is held against rotation, said connection being yieldable to accommodate universally pivotal movement between said rotor and pylon, a flexible shaft extending into said blades, means including a planet element journalled on said hub frame and having a driving connection with said sun element whereby it is driven as the result of rotation of said frame about said sun element and means for transmitting rotation to said flexible shaft from said planet element.

6. In a helicopter, a rotor including a hub frame and a plurality of blades each connected to said hub frame at its inner end and provided with a jet motor at its outer end; rotatable control elements journalled in the respective blades, a non rotating pylon carried by said rotor, said hub having a universally pivotal connection with said pylon, and planetary power takeoff transmission means for transmitting drive to said control elements, comprising a sun element rotatably mounted upon said hub frame, a yielding drive element connecting said sun element to said pylon shaft so as to restrain rotation of said sun element while allowing said sun element to tilt with said hub frame, a planet element journalled in said hub frame and having a driving connection with said sun element whereby it is driven as the result of rotation of said hub frame about said sun element, and means for transmitting movement from said planet element to a control element.

7. A helicopter as defined in claim 5, wherein said connection between said sun element and said pylon comprises a coil spring attached at one end to said pylon and at its other end to said sun element, said coil spring being yieldable axially to allow translational movement of said sun element with reference to said pylon.

8. In a helicopter, a sustaining and propelling rotor, a pylon having a universally pivotal connection with said rotor and suspended therefrom when the craft is in flight, said connection permitting the plane of the rotor to be inclined from a normal plane at right angles to the axis of said pylon, said rotor including a hub and pitch adjustable blades pivoted thereto, a swash ring having a universally tiltable and longitudinally slidable connection with said pylon, and linkage connecting said swash ring to said blades for transmitting collective pitch control thereto as the result of longitudinal sliding movement of said swash ring and for transmitting cyclic pitch control thereto as the result of tilting of said swash ring, said linkage including rigid push-pull links having their longitudinal axes substantially intersecting the center of universally pivotal movement between said pylon and rotor, whereby the control settings of said linkage are substantially unaffected by tilting movements of said rotor with reference to said pylon.

9. In a rotor for a helicopter having operator supporting means suspended therefrom when in vertical flight, a hub assembly universally pivoted to said supporting means, said hub assembly including as a rigidly connected part thereof an elongated frame having fly weights at its opposite ends, sustaining blades pivoted to said hub assembly for flapping and pitch change movements, the longitudinal axis of said hub frame being disposed transversely to the pitch-change axes of said blades, a control frame carried by said hub frame, and means fulcrumed on the longitudinal axis of said control frame and linked to said blades for transmitting pitch adjusting movements thereto, said fly weights providing gyroscopic stability of said hub assembly about the rotor axis, and said hub assembly transmitting gyroscopic stability to said longitudinal axis of the control frame.

10. A helicopter as defined in claim 9, wherein said control transmitting means includes a plurality of push-pull links the longitudinal axes of which substantially intersect the axis of universally pivotal connection between the hub and the pylon, whereby to transmit control forces for changing blade pitch without applying a moment to the hub.

11. In a helicopter, a sustaining and propelling rotor, a pylon having a universally pivotal connection with said rotor and suspended therefrom when the craft is in flight, said connection permitting the plane of the rotor to be inclined from a normal plane at right angles to the axis of said pylon, said rotor including a hub and a plurality of blades pivoted thereto for flapping and pitch change movements, a swash ring pivotally mounted on said pylon, and linkage connecting said swash ring to said blades, for transmitting pitch adjusting movements to the blades, said linkage including a plurality of push-pull links for transmitting control forces along axes substantially intersecting the center of universally pivotal movement between said pylon and rotor, whereby the control settings of said linkage are substantially unaffected by tilting movements of said rotor with reference to said pylon.

12. A helicopter as defined in claim 11, wherein said linkage further includes an elongated control frame hingedly suspended from said hub, said hub including an elongated frame disposed at an angle of approximately 45 degrees with reference to the longitudinal axis of said control frame and transversely with reference to the pitch change axes of said blades, said hub frame being provided at the extremities thereof with fly weights for gyroscopically stabilizing said hub frame, the axis of hinging movement between said control frame and said hub being parallel to the longitudinal axis of said control frame, and said linkage including elements fulcrumed on said control frame on said longitudinal axis thereof.

13. In a helicopter, a sustaining and propelling rotor, a pylon having a universally pivotal connection with said rotor and suspended therefrom when the craft is in flight, said connection permitting the plane of the rotor to be inclined from a normal plane at right angles to the axis of said pylon, said rotor including a hub and blades pivotally connected to said hub for flapping and pitch change movements, said hub including an elongated frame the longitudinal axis of which is disposed transversely to the longitudinal axes of the blades, said hub frame having, at the extremities thereof, fly weights for gyroscopically stabilizing said hub frame, and a plurality of tension links pivotally connected to said hub frame at points disposed laterally of said longitudinal hub frame axis and connected at their other ends to said blades for taking the centrifugal loads developed by the rotation of said blades in flight, the centrifugal pull of said links against said hub frame resisting tilting of said hub frame about said longitudinal axis, a control frame suspended from said hub and hinged thereto, and linkage, fulcrumed upon said control frame, for transmitting blade pitch adjusting movements to said blades.

14. A helicopter as defined in claim 13, wherein said control transmitting means includes crank arms pivoted upon respective blades, levers pivoted at their outer ends to said control frame and projecting toward the axis of said pylon, links pivoted to said levers and to said crank arms, a swash ring, and push-pull links pivoted to said swash ring and to the inner ends of said levers, said push-pull links being disposed with their longitudinal axes substantially intersecting the center of universally pivotal connection between said rotor and pylon, whereby the control settings of said linkage are substantially unaffected by tilting movement of said rotor with reference to said pylon.

DAVID T. DOBBINS.

REFERENCES CITED

The following references are of record in the file of this patent:

UNITED STATES PATENTS

| Number | Name | Date |
|---|---|---|
| 853,542 | Faehrmann | May 14, 1907 |
| 1,116,257 | Flatau | Nov. 3, 1914 |
| 1,532,601 | Regener | Apr. 7, 1925 |
| 1,664,295 | Hall | Mar. 27, 1928 |
| 1,775,861 | Lehberger | Sept. 16, 1930 |
| 1,820,946 | Pitcairn | Sept. 1, 1931 |
| 1,867,822 | Gunn | July 19, 1932 |
| 1,951,817 | Blount | Mar. 20, 1934 |
| 2,058,678 | Fry | Oct. 27, 1936 |
| 2,142,601 | Bleecker | Jan. 3, 1939 |
| 2,318,259 | Sikorsky | May 4, 1943 |
| 2,330,056 | Howard | Sept. 21, 1943 |
| 2,368,698 | Young | Feb. 6, 1945 |
| 2,376,523 | Synnestvedt | May 22, 1945 |
| 2,444,070 | Stanley | June 29, 1948 |

FOREIGN PATENTS

| Number | Country | Date |
|---|---|---|
| 265,272 | Great Britain | Jan. 31, 1927 |
| 557,011 | Great Britain | Nov. 1, 1943 |
| 47,909 | Netherlands | Mar. 15, 1940 |